United States Patent [19]

Young

[11] 3,846,337

[45] Nov. 5, 1974

[54] PHOSPHATE-SILICA-ALUMINOSILICATE COMPOSITIONS OF IMPROVED CRUSHING STRENGTH AND METHODS OF PREPARING THE SAME

[75] Inventor: Dean Arthur Young, Yorba Linda, Calif.

[73] Assignee: Union Oil Company of California, Los Angeles, Calif.

[22] Filed: July 20, 1972

[21] Appl. No.: 273,418

[52] U.S. Cl. ............................... 252/437, 252/435
[51] Int. Cl. ............................................. B01j 11/82
[58] Field of Search ........................... 252/435, 437

[56] References Cited
UNITED STATES PATENTS

| | | | |
|---|---|---|---|
| 3,354,096 | 11/1967 | Young | 252/435 |
| 3,554,926 | 1/1971 | Statman et al. | 252/435 |
| 3,560,586 | 2/1971 | Kronig et al. | 252/435 X |
| 3,673,111 | 6/1972 | Hovarth | 252/435 |

Primary Examiner—Patrick P. Garvin
Attorney, Agent, or Firm—Richard C. Hartman; Lannas S. Henderson; Michael H. Laird

[57] ABSTRACT

Silica-bonded silicate particles of improved crushing strength are prepared by admixing reactive silica sols with the siliceous particles in an aqueous medium under conditions of temperature and contact time sufficient to at least partially bond the sol and silicate, contacting the resultant combination with ammonium phosphate and/or the acid phosphates of either ammonium or one or more polyvalent metals having atomic radii less than about one angstrom and drying the resultant composite.

7 Claims, No Drawings

PHOSPHATE-SILICA-ALUMINOSILICATE COMPOSITIONS OF IMPROVED CRUSHING STRENGTH AND METHODS OF PREPARING THE SAME

BACKGROUND

Both amorphous and crystalline siliceous refractory oxides such as aluminosilicates have found wide application in chemical separation and conversion due to their unique physical and chemical characteristics. However, the most efficient utilization of these compositions involves their use in processes in which a particle-form aggregate of the silicate particles is subjected to physical degradation or attrition due to physical contacting and thermal stress. Moreover, it is often necessary to regenerate silicate adsorbents, catalysts and the like by subjecting them to relatively elevated temperatures which often exceed 1,000°F. Such treatment results in the development of considerable stress within the silicate particles. These stresses, whether they be due to the thermal expansion or to vaporization of entrapped water or other volatile matter, are also responsible for particle decrepitation.

The problems associated with catalyst and adsorbent particle strength are of considerable import in contemporary physical separation and catalytic conversion systems, notably the widely used fixed and fluid bed petroleum refining and chemical conversion processes. These systems perform better in several respects when operating with pelleted catalysts within the size range of about 1/32 to about ½-inch average particle diameter. In addition to strictly chemical properties, several physical characteristics such as bulk density, hardness, crushing strength and attrition resistance are also important.

The ability of a catalyst particle to retain its shape and size notwithstanding the mechanical abrasion to which it is subjected in shipment, reactor loading, and process use, is a characteristic of economic importance. Any substantial crumbling or breaking during loading, crushing brought about by the mere weight of the catalyst bed, or attrition due to particle movement can result in catalyst loss and fouling of essential process systems. For example, the presence of unevenly distributed fine particles in the catalyst bed can promote channeling of process fluid, uneven contacting and conversion, and the development of localized "hot spots." Such "hot spots" can have serious consequences in highly exothermic processes such as hydrocracking. The resultant extreme temperatures often promote rapid catalyst deactivation and may even cause uncontrollable runaway reactions. The accumulation of substantial amounts of fine particles also usually increases bed density and pressure drop through the bed.

These and other difficulties have promoted extensive investigation of factors which influence the physical strength of silicate particles. A substantial amount of this work has involved investigation of particular aluminosilicate-refractory oxide binder combinations which form compatible strong composites. For example it is generally well recognized that silicates, such as aluminosilicate zeolites, can be effectively bonded with alumina binders. It has also been observed in U.S. Pat. No. 3,354,096, that aluminosilicates can be formed into structurally stable particle aggregates by the use of phosphate binders particularly when the phosphate and aluminosilicate are further admixed with an alumina binder. However, aggregate strength and chemical activity will be influenced by the nature of the additional binder, e.g., silica, alumina, etc.

The properties of any silicate catalyst or adsorbent are determined, to some degree, by the refractory oxide binder and the manner in which the combination of binder and silicate is prepared. For example, the use of acidic silica as a binder for silicates results in the production of composites having both physical and chemical properties differing somewhat from composites bound with alumina or other non-acidic refractory oxides. The pore structure and surface acidity of silicas and the manner in which they combine with crystalline or amorphous silicates impart properties to the resultant composites which differ, at least in degree, from the properties exhibited by composites bonded with non-acidic refractory oxides.

Heretofore, the physical properties of silica-bonded silicates were inferior to composites formed with other refractory oxides. Thus, silica binders were less attractive than available alternatives. This problem - the relatively low bond strength between silica and silicates - is further complicated by the fact that the physical stability of these materials often cannot be improved to the extent desired with previously available bonding agents and methods. For example, in an attempt to prepare an aluminosilicate composite particle with phosphates and acidic silica by conventional procedures, I observed that the product properties were inferior even to those of the silica-aluminosilicate composites formed in the absence of any phosphate whatever. Further investigation indicated that the acid character of the phosphate may have promoted coagulation of the silica upon itself rather than with the silicate. This phenomenon is believed to result in the formation of heterogeneous composite of silicate particles and silica agglomerates having very low compressive strength.

I have now discovered a procedure whereby these or other adverse effects can be eliminated or at least mitigated so as to enable the production of a silica-bound silicate aggregate having markedly higher compressive strength competitive with alumina-bound composites. In addition, these composites exhibit physical and chemical properties characteristics of silica binders.

It is therefore one object of this invention to provide an improved silica-bound silicate composite composition. It is another object to provide an aluminosilicate-silica composite of relatively high resistance to compressive forces. It is yet another object to provide a method for producing structurally stable silicate-silica composites. Another object of this invention is the provisions of a method for producing aluminosilicate-silica composites in which bonding of the several constituents is improved by metaphosphates. Yet another object is the provision of an improved hydrocarbon conversion catalyst. Another object is the provision of an attrition resistant silica-bonded aluminosilicate composite. Yet another object of this invention is the provision of a method for preparing catalytically active aluminosilicate composites bound with silica and being relatively structurally stable. In accordance with another object there is provided an improved fluid-solids contacting process. Yet another object involves the reduction of particle attrition, solids loss and/or process pressure differential variance due to particle attrition in fluid-solids contacting systems. Another objective of this invention is the provision of an improved hydrocarbon conversion process involving fluid-solids contacting.

In accordance with one embodiment of this invention a particulate silicate, either natural or synthetic, crystalline or amorphous, is mixed with a reactive silica sol under conditions of temperature and time sufficient to bond the silica and silicate. The polyphosphate and/or polyphosphate precursor convertible to a polyphosphate upon thermal treatment is then added, and the combination is thermally treated. The thermal treatment should be sufficient to convert the polyphosphate precursor to a polyphosphate and react the polyphosphate with the silica and/or silicate. Temperatures in excess of about 200°F. are presently preferred for this purpose.

The preferred polyphosphates are the tetraphosphates and polymers containing a higher number of phosphorous atoms. It is further preferred that the polyphosphates contain one or more types of disassociable cations such as hydrogen and ammonium ions, and one or more polyvalent metal cations having ionic radii of less than about one angstrom. The polyphosphate precursors are similarly characterized and should be capable of polymerizing to form polyphosphates at elevated temperatures, e.g., in excess of about 200°F. Thus, the polyphosphate precursors should contain at least one disassociable cation which can be removed upon thermal treatment. Illustrative cations are hydrogen and ammonium cations. It is also preferred that the polyphosphate precursors contain at least one type of polyvalent metal cation having an ionic radius of less than one angstrom. Illustrative polyphosphate precursors are the acids of phosphorous, such as orthophosphoric acid, metaphosphoric acid, and polyphosphoric acids; the ammonium salts of phosphoric acid such as ammonium phosphate, ammonium monohydrogen phosphate, ammonium dihydrogen phosphate, ammonium polyphosphates, ammonium acid polyphosphates; and the mixed hydrogen and/or ammonium phosphates of weakly basic polyvalent metal cations having ionic radii of less than about one angstrom. Illustrative metal-containing polyphosphate precursors are aluminum monohydrogen phosphate, aluminum dihydrogen phosphate, aluminum ammonium phosphates, acid aluminum polyphosphates, and similar analogs of magnesium, beryllium, iron, zinc and the like. The weakly basic polyvalent metal cations having atomic radii of less than about one angstrom are presently preferred due to the belief that superior physical stability results from the use of these cations.

The interaction of the polyphosphates or polyphosphate precursors, silica sol and silicate can be obtained by treating the mixture at elevated temperatures. These temperatures should be sufficient to promote the condensation of the polyphosphate precursors, or the polyphosphates themselves. Chemical interaction between the phosphates and silica or other constituents of the mixture seems to be promoted at elevated temperatures. These temperatures should exceed about 200°F.

Thermal treatment is usually obtained without any added expense or complexity. The aggregates are usually preformed into a desired shape by extrusion, pelleting, casting or the like, followed by drying and calcination. The drying and calcination steps are sufficient to obtain the desired thermal treatment of the polyphosphates. Thus an additional heating step is not required for this purpose.

Several aspects of this procedure are essential to the production of the most stable aggregates. Firstly, it is necessary to employ a reactive silica in the sense that it should have the ability of reacting either with itself or with the silicate to form a stable aggregate. Thus, the more reactive silica sols are presently preferred. Illustrative of commercially available sols are "Santocel," "Hi-Sol," "Quso," "Ludox," and the like. Many of these are referred to in U.S. Pat. No. 3,216,789.

However, the reactive silicas are more expensive than several alternative sources. The expense of these reactive silicas is due primarily to the difficulty involved in their preparation. For example, "Ludox," marketed by DuPont as Ludox HS, described in the U.S. Pat. Nos. 2,574,902 and 2,597,782, and similar species of silica, are prepared by exhaustive ion exchange of dilute sodium silicate solutions followed by carefully controlled concentration and stabilization involving the addition of controlled amounts of prescribed basic substances. The resulting hydrosols are several times as costly as sodium silicate on an equivalent $SiO_2$ basis. Therefore, the partially polymerized sols prepared by partial acidification of sodium silicate or other basic silicates, i.e., the alkali and alkaline earth metal silicates, are presently preferred primarily for economic reasons.

Most of the amorphous solid silicas are prepared from silica hydrosols and accordingly are even more expensive, as are the dry aerogels and flame-blown silicas of which "Cab-o-Sil" is representative. Moreover, these aerogels and flame-blown silicas are fluffy submicron size powders having very low bulk densities which render their incorporation into aqueous systems more difficult since they tend to form non-dispersible, viscous gelatinous mixtures. Several less expensive alternatives have been investigated by other authors. For example, basic silicates such as alkali and alkaline earth metal silicates, ammonium silicate, or silicic acid and the like can be converted to sols by contacting with mineral or organic acids such as sulfuric, hydrochloric, nitric, acetic and the like. It is generally preferable to use at least a stoichiometric quantity of acid to neutralize essentially all of the basic silicate. Suitable sols can also be prepared from aqueous solutions of silicic acid by hydrolyzing silicon tetrachloride in water or by exchanging basic silicate solutions with anion exchange resins.

However, for purposes of simplicity and economy the silica sols are preferably prepared from the alkali and alkaline earth metal silicates by neutralization with a strong mineral acid. A classical method of forming colloidal silicas involves adding sodium silicate to a large excess of dilute hydrochloric acid. The colloidal silica solution can be purified by dialyzing the sodium chloride ions through a semi-permeable membrane. In the alternative, the soluble anions and cations can be removed by spray drying the colloidal silica and washing with demineralized water.

The presently preferred colloidal sols are those in which a predominance of the silica particles have diameters less than about 1 micron, preferably less than about 50 millimicrons. However, a range of particle sizes is preferred. These particles are characterized by relatively high concentration of surface hydroxyl groups which are believed to be responsible for their superior bonding properties.

Reactive hydrous sols can be combined directly with the silicate in the presence of sufficient water to enable adequate mixing and reaction of the sol and silicate. However, it is necessary that the anhydrous sols be hydrated prior to combination with the silicate. Hydration can be readily accomplished by aging an anhydrous sol in water for extended periods which usually exceed about 10 hours. Elevated temperatures above about 100°F. and high pH levels above about 9 are known to accelerate hydration.

Although the methods herein described are particularly attractive for the production of silica-bound aggregates, they can also be employed with advantage with silica binders containing a substantial proportion of other refractory oxides such as alumina, zirconia, magnesia, titania and the like. The problems involved in obtaining a strong composite are not as acute when the binder contains refractory oxides other than silica. Nevertheless, the problems associated with silica bonding still exist. Thus the properties of such combinations can be improved by these methods. However, when it is preferable to retain the chemical characteristics of a silica-bonded aggregate the silica concentration in the binder should be at least about 50 weight percent, preferably abouout 75 to 100 percent.

The siliceous particles having utility in this invention can be either natural or synthetic, crystalline or amorphous. Exemplary of such materials are silica gels, cogels or mixtures of silica and other refractory oxides such as alumina, zirconia, magnesia and the like, crystalline and amorphous aluminosilicates and similar materials. It is presently believed that it is more difficult to obtain aggregates of high physical strength when bonding silicates or siliceous substances of relatively high silica content. Thus these methods are of particular advantage when the siliceous particles contain more than about 50 weight percent silica based on dry weight.

A class of silicates to which the method of this invention are particularly applicable are the crystalline and amorphous, natural and synthetic aluminosilicates. These aluminosilicates are composed of silica, alumina and one or more exchangeable cations such as sodium, hydrogen, ammonium, magnesium, calcium, potassium, and the like. The crystalline aluminosilicates are further characterized by identifiable repeating crystal units prescribing pores having diameters predominantly above about 4 angstroms. The crystalline materials are generally preferred when the aluminosilicate-silica aggregates are destined for application in catalytic processes since they usually exhibit higher activity for most reactions. Presently preferred zeolites include those having $SiO_2/Al_2O_3$ ratios within the range of about 2 to about 15; preferably at least about 3.

The faujasite type zeolites such as Zeolites X and Y discussed in U.S. Pat. Nos. 2,882,244 and 3,130,007, respectively, are preferred for many hydrocarbon conversions. Exemplary of other synthetic aluminosilicates are Zeolite A, U.S. Pat. No. 2,882,243; Zeolite L, Belgium Pat. No. 575,117; Zeolite D, Canada Pat. No. 661,981; Zeolite R, U.S. Pat. No. 3,030,181; Zeolite S, U.S. Pat. No. 3,054,657; Zeolite T, U.S. Pat. No. 2,950,952; Zeolite Z, Canada Pat. No. 614,995; Zeolite E, Canada Pat. No. 636,931; Zeolite F, U.S. Pat. No. 2,996,358; Zeolite O, U.S. Pat. No. 3,140,252; Zeolite B, U.S. Pat. No. 3,008,803; Zeolite Q, U.S. Pat. No. 2,991,151; Zeolite M, U.S. Pat. No. 2,995,423; Zeolite H, U.S. Pat. No. 3,010,789; Zeolite J, U.S. Pat. No. 3,011,869; Zeolite W, U.S. Pat. No. 3,012,853 and Zeolite KG, U.S. Pat. No. 3,056,654. Exemplary of the naturally occurring crystalline aluminosilicates are levynite, dachiardite, crionite, faujasite, analcite, paulingite, noselite, ferriorite, heulandite, scholecite, stibite, clinoptilolite, harmotome, phillipsite, brewsterite, flakite, datolite, chabazite, gmelinite, canrinite, leucite, lazurite, scaplite, mesolite, ptilolite, mordenite, nepheline, natrolite and sodalite.

Another parameter which affects structural stability as well as chemical and physical activity is the silicate particle size and particle size distribution. Composites of higher structural stability are usually prepared from lower particle size silicates having relatively broad particle size distributions. Consequently it is generally preferable to avoid the use of silicate particles having weight average diameters greater than about 50 microns. Silicates having weight average particles sizes within the range of about 0.5 to about 20 microns are presently preferred.

I have also observed that the addition of phosphates to hydrous silica sols prior to a substantial degree of bonding of the silica and silicate markedly reduces the physical stability of the resultant composite. As illustrated by the examples hereinafter detailed, the physical stability of aggregates formed by adding the phosphate prior to substantial silica-silicate bonding is actually lower than that of otherwise identical composites prepared in the absence of any phosphate binder whatever. The reason for this effect is not definitely known. However, it may be that the phosphate promotes coagulation of the silica upon itself rather than with the silicate. In any event, I have found that it is necessary to effect a substantial degree of reaction between the silica and the silicate before addition of the phosphate. The most relevant parameters in this regard are the reactivity of the silica, the temperature and concentration at which the silicate and silica source are contacted and the duration of such contacting. It is usually necessary to mix the silicate and silica sol at a temperature and for a period of time sufficient to promote bonding. The water content of the reaction mixture should be reduced to less than about 50 and preferably less than about 30 weight percent prior to addition of the phosphate. The temperature of the system should be maintained at a level of at least about 40°F. However, for purposes of convenience the reaction temperature is generally at least about 60°F. Preferred temperatures are usually within the range of about 60° to about 200°F. The reaction between the silicate and silica sol should be allowed to proceed for a period sufficient to effect a substantial degree of bonding prior to the addition of the phosphate. As a general rule this reaction step should be continued for a period of at least about 10 minutes, preferably for about 20 minutes to about 2 hours.

Essentially any amount of silica sol can be employed in these compositions. Silica concentrations are usually within the range of about 3 to about 98 weight percent, preferably about 5 to about 90 weight percent. A significant advantage of these methods is that sufficient bonding between the silicate particles per se, or between the silicate and silica sol particles, can be obtained so as to produce a composite of high physical strength containing relatively minor silica concentrations of 25 percent or less on a dry weight basis. The silicate concentrations are usually at least about 2 weight percent and often fall between about 5 and 80 weight percent.

Following the completion of the desired degree of bonding the selected phosphate is added to the reaction mixture. Significant increases in physical stability can be realized by the addition of only nominal amounts of phosphate. However, it is presently preferred that the phosphate concentration be at least about 0.5 weight percent and preferably within a range of about 1 to about 30 weight percent $P_2O_5$, based on the combined dry weight of the silicate, silica and phosphate.

Care should also be taken after addition of the polyphosphates and/or polyphosphate precursors to avoid the use of conditions which promote hydrolysis or depolymerization of the polyphosphates to orthophosphates or lower molecular weight analogs. The hydrolysis of polyphosphates is promoted in either basic or acidic media. Thus it is presently preferred that the mixture of silicate, phosphate and silica sol be reacted at a pH between about 5 and 9. However, this limitation is not a matter of strict necessity since the depolymerization of polyphosphates is known to be rate limited and will not exceed tolerable proportions unless strongly acidic or basic conditions are maintained at elevated temperatures for period of an hour or more. Thus, the effects of polyphosphate depolymerization can be overcome by preventing the exposure of the polyphosphates to hydrolyzing conditions for extended periods. Moreover, it is presently preferred that the water content of the mixture be reduced to about 20 weight percent or less shortly after phosphate addition. The particles are preferably dried within less than about one hour after phosphate addition by heating at a temperature of at least about 180°F., preferably at least about 200°F., for at least about 30 minutes, usually in excess of about one hour. It is presently believed that even better results are obtained if the water content is reduced even further to a level below about 10 weight percent at an even more rapid rate.

In view of these observations, it is presently preferred that the silicate and silica sol be intimately mixed for a period of at least about ten minutes at a temperature of at least about 60°F. and a water concentration of less than about 50 weight percent followed by addition of the selected phosphate or phosphates at a pH between about 5 and 9 and promptly drying and/or calcining. In one embodiment the hydrous silicate-silica sol mixture can be formed into pellets and/or extrudates by conventional procedures which are then impregnated with an aqueous solution of the selected phosphate, dried and calcined. When these preferred conditions are observed it is a relatively simple matter to consistently produce composites having crushing strengths of at least about 6 pounds, generally an excess of about 8 pounds for ⅛ by ⅛-inch particles after calcination. Calcination temperatures usually exceed about 400°F. and are preferably within the range of about 500° to about 1,600°F.

The catalytic activity of any of these combinations for chemical reactions such as hydrocracking, isomerization, hydrogenation, dehydrogenation, polymerization, reforming, catalytic cracking and the like, is a function of numerous variables. The characteristics of the silicate are, of course, important. Other factors include the presence of catalytically active metals or metal compounds and the form in which they are present. The active metals usually combined with silicates, particularly zeolitic aluminosilicates, are those of Groups II, IV, V, VI and VIII of the Periodic Chart in addition to those of the actinide and lanthanide series. They can be present either in the form of the free metal or the corresponding cation, sulfide or oxide.

The active metal concentration may vary considerably with the intended application. Generally, any amount of these active constituents between about 0.1 and about 40 weight percent may be employed. However, considerably lower concentrations of the noble metals on the order of 0.2 to 5 weight percent are generally preferred.

The activity of these constituents and the specificity they exhibit for the conduct of any given reaction mechanism is also determined, at least in degree, by the manner in which they are combined with the silicate or the silica-silicate aggregate. For example, it is generally known that many of the metal cations can be associated with aluminosilicates by ion-exchange. Such exchange is conveniently accomplished by digesting the aluminosilicate silicate in an aqueous solution of an ionizable compound of the desired metal. Such a procedure is described in Belgian Pat. No. 598,686. Th active metal or metal compound such as the oxide and sulfide can also be incorporated by precipitation into the pores of the silicate or aggregate from an aqueous solution of a soluble salt of the desired metal or by mulling with a partially hydrated or anhydrous metal or metal compound. The active metals can be oxidized by calcination in an oxidizing atmosphere and/or sulfided by contacting with a sulfur donor such as hydrogen sulfide, mercaptans, carbon disulfide or elemental sulfur.

These aggregates can be used in the form of castings, extrudates, pellets, and the like for a variety of purposes such as adsorbents and catalysts. The catalysts can be used either with or without added active metal components for catalytic cracking, isomerization, alkylation, reforming, and hydrogenative conversion such as hydrocracking, hydrogenation, and hydrofining., e.g., desulfurization and denitrogenation. Catalytic cracking conditions usually include temperatures of at least 600°F., generally 750° to 1,000°F. and pressures between atmospheric and 200 psig. Hydrogenative conversions can be accomplished at various conditions depending on feedstock characteristics and the desired degree of conversion. Hydrogenation can be effected at pressures of 500 psig and above and temperatures of 500° to 1,000°F, usually 600° to 900°F. Hydrogen is added at rates of at least about 500 SCF/bbl, usually 1,000 to 20,000 SCF/bbl. Hydrofining and hydrogenation feeds usually boil above 400°F., usually between about 500° and 1,200°F.

The increased physical strength of these aggregates renders them particularly attractive for use in either fixed or fluid bed adsorption or conversion systems whether the process fluid is a vapor, liquid, or a combination of both. Thus, the use of these materials can be advantageous in processes wherein the aggregates are contacted with a flowing fluid stream under conditions sufficient to promote at least some attrition of the aggregate particles.

The following examples are presented to be illustrative of the concept of this invention and should not be construed as limiting thereof.

EXAMPLE I

A magnesium acid phosphate binder was prepared by dissolving 2.7 grams of magnesium oxide in 144 grams of 33 percent phosphoric acid. The pH of this solution was increased to 3.4 by adding a small quantity of 28 percent aqueous ammonia. The binder was then mixed with magnesium zeolite Y powder in proportions sufficient to provide 27.4 weight percent equivalent $P_2O_5$ and 2.6 weight percent MgO. The resulting paste was formed into ⅛- by ⅛-inch pellets, dried at 212°F., and calcined for 2 hours at 1,000°F. The uncalcined pellets were so weak that it was difficult to remove them from the forming sheet and transfer them to the calcination furnace. Calcination apparently did not substantially improve the structural stability of the pellets which had crushing strengths of less than 2 pounds, too low to monitor with the available apparatus.

EXAMPLE II

A second batch of pellets bonded with 15 weight percent silica was prepared by mixing magnesium zeolite Y powder with "Ludox LS" silica sol (DuPont de Nemours, Wilmington, Del.) and casting as described in Example I. The average crushing strength after drying at 212°F. and calcination at 1,000°F. was 6.8 pounds.

EXAMPLE III

The magnesium acid phosphate binder prepared as described in Example I was mixed with the magnesium zeolite Y powder in proportions sufficient to provide an equivalent $P_2O_5$ concentration of 13.7 weight percent and an equivalent MgO concentration of 1.3 weight percent. The "Ludox LS" was then combined with this mixture to provide an equivalent silica concentration of 15 weight percent $SiO_2$. The pellets formed from this mixture were dried and calcined as described in Example I. The average crushing strength of this combination was only 4.0 pounds. This was substantially below the 6.8 pounds crushing strength of the silica-bonded pellets of Example II prepared without any phosphate.

EXAMPLE IV

A set of silica-bonded magnesium Y pellets were prepared in accordance with Example II without the final calcination. The dried pellets were wetted with a 3.4 pH magnesium acid phosphate solution in the amount of 0.4 milliliters of the solution per gram of the aluminosilicate-silica composite. The resultant admixture had a pH of about 5. By this procedure 11 percent equivalent $P_2O_5$ and 1.0 weight percent equivalent MgO were added to the composite. The pellets were then redried at 212°F. an finely calcined at 1,000°F. for two hours. The average crushing strength of this product was 10.1 pounds.

Examples I and III illustrate that the presence of magnesium acid phosphate did not strengthen the zeolite pellets but in fact weakened them when the silica and silicate were not allowed to react before addition of the phosphate.

I claim:

1. The method of forming structurally stable silica bonded aggregates of particulate silicates comprising the steps of intimately mixing said silicate with a colloidal hydrous silica sol in the presence of water at a temperature of at least about 40°F and for a period of at least about 10 minutes sufficient to react said silica sol with said silicate, reacting with the resultant combination about 1 to about 30 weight percent determined as $P_2O_5$ of at least one polyphosphate or polyphosphate precursor convertible to a polyphosphate at temperatures above about 180°F and selected from the group consisting of phosphoric acids, ammonium salts of phosphoric acids, and hydrogen and ammonium phosphates of polyvalent metal cations having ionic radii less than about 1 angstrom, forming aggregates of said silicate particles, and heating the resultant aggregates at a temperature of at least 180°F for at least about 30 minutes wherein said silicate constitutes at least about 2 weight percent of said aggregate on a dry weight basis and is selected from the group consisting of silica gels, physical mixtures and cogels of silica and another refractory oxide, an crystalline aluminosilicate zeolites comprising at least about 50 weight percent silica on a dry weight basis, and said silica sol constitutes about 5 weight percent of said aggregate on a dry weight basis and has a average particle diameter below about 1 micron.

2. The method of claim 1 wherein said silicate is a crystalline aluminosilicate zeolite and constitutes at least about 5 weight percent of said aggregate, and said aggregate is heated at a temperature of at least about 200°F and for a period of time sufficient to reduce its water content to a level below about 20 weight percent subsequent to the addition of said phosphate.

3. The composition consisting essentially of a structurally stable silica-bonded aggregate containing at least about 2 weight percent of a particulate silicate selected from the group consisting of silica gels, physical mixtures and cogels of silica and another refractory oxide, and crystalline aluminosilicates, and an amount of phosphorus corresponding to about 1 to about 30 weight percent $P_2O_5$, formed by the method consisting essentially of the steps of reacting a mixture of said silicate and a colloidal hydrous silica sol in the presence of water at a temperature of at least about 40°F for a period of at least about 10 minutes sufficient to react said silica sol with said silicate, said silica sol having a average particle diameter below about 1 micron and constituting at least about 5 weight percent of said aggregate on a dry weight basis, admixing with the resultant combination about 1 to about 30 weight percent determined as $P_2O_5$ of a polyphosphate or polyphosphate precursor convertible to a polyphosphate at elevated temperature selected from the group consisting of phosphoric acids, ammonium salts of phosphoric acids, and hydrogen and ammonium phosphates of polyvalent metal cations having ionic radii less than about 1 angstrom, forming aggregates of said silicate particles, and drying the resultant combination at a temperature of at least about 200°F for at least about 30 minutes.

4. The composition of claim 3 wherein said silicate is a crystalline aluminosilicate zeolite comprising at least about 50 weight percent silica having a average particle diameter less than about 50 microns, and said zeolite constitutes at least about 5 weight percent of said aggregate.

5. The composition of claim 3 further comprising a catalytic amount of at least one of the metals, metal oxides and metal sulfides of Periodic Groups II, IV, V, VI, and VIII and the actinide and Lanthanide series.

6. The composition of claim 3 wherein said particulate silicate is a crystalline aluminosilicate zeolite containing at least about 50 weight-percent silica on a dry weight basis having a average particle diameter less than about 50 microns, said zeolite constitutes at least 5 weight-percent of said aggregate on a dry weight basis, and said aggregate is formed by the method consisting essentially of reacting said combination of particulate silicate and said silica sol at a temperature of at least about 60°F for at least about 10 minutes, adding said phosphate to said combination, forming aggregates of said silicate particles, and heating said aggregates at a temperature of at least about 200°F for a period sufficient to reduce the water content of said aggregates to less than about 20 weight percent.

7. The composition of claim 4 consisting essentially of said zeolite, said colloidal silica sol, and said phosphate, wherein said combination of said particulate silicate and said silica sol is reacted at a temperature of at least about 60°F for a period of at least about 10 minutes prior to the addition of said phosphate, and the combination of said particulate silicate, silica sol and phosphate is thermally treated at a temperature of at least about 200°F for a period of at least about 30 minutes sufficient to reduce the water content of said aggregate to less than about 10 weight-percent.

* * * * *